US012055284B1

(12) United States Patent
Warner et al.

(10) Patent No.: US 12,055,284 B1
(45) Date of Patent: Aug. 6, 2024

(54) OPTIC AND TRIM RETENTION RING

(71) Applicant: ABL IP Holding LLC, Atlanta, GA (US)

(72) Inventors: Benjamin J. Warner, McCordsville, IN (US); Brandon S. Mundell, Indianapolis, IN (US); Stephen H. Clark, Downers Grove, IL (US); James S. Conn, Conyers, GA (US); Gautham Kemparaju, Lilburn, GA (US); Rosa A. Peredo, Elizabeth, NJ (US); John Whittenhall, Roselle, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/238,294

(22) Filed: Aug. 25, 2023

(51) Int. Cl.
*F21V 17/14* (2006.01)
*F21V 17/18* (2006.01)
*F21V 23/00* (2015.01)
*F21Y 105/16* (2016.01)
*F21Y 115/10* (2016.01)

(52) U.S. Cl.
CPC .............. *F21V 17/14* (2013.01); *F21V 17/18* (2013.01); *F21V 23/005* (2013.01); *F21Y 2105/16* (2016.08); *F21Y 2115/10* (2016.08)

(58) Field of Classification Search
CPC ......... F21V 23/005; F21V 17/14; F21V 17/18
See application file for complete search history.

(56) References Cited

U.S. PATENT DOCUMENTS 10,041,638 B2 * 8/2018 Vasquez ................ F21V 29/773
2013/0010476 A1 * 1/2013 Pickard ................... F21V 17/10 362/311.03
2021/0156546 A1 * 5/2021 Demuynck ............. F21V 17/18

* cited by examiner

*Primary Examiner* — Evan P Dzierzynski
*Assistant Examiner* — Nathaniel J Lee
(74) *Attorney, Agent, or Firm* — Kilpatrick Townsend & Stockton LLP

(57) ABSTRACT

An optical assembly includes a retention ring configured to couple an optic and a trim. The optic can receive light from a light source and include an optic coupler. The trim can surround the optic and direct the light away from the light source. The trim can include a trim coupler. The retention ring can tool-lessly couple with the optic and the trim. The retention ring can include an optic retention element configured to tool-lessly couple with the optic coupler to couple the optic to the retention ring; and a trim retention element spaced radially outwardly from the optic retention element. The trim retention element can tool-lessly couple with the trim coupler to couple the trim to the retention ring radially outwardly from the optic.

20 Claims, 11 Drawing Sheets

OPTIC AND TRIM RETENTION RING

FIELD OF DISCLOSURE

This disclosure relates generally to lighting systems and more specifically to a luminaire that may include a retention ring used to mount an optic and a trim.

BACKGROUND

While luminaire designs can vary depending on the application and desired lighting characteristics, they all include one or more light sources and many include one or more optical components that control the directionality or other properties of the emitted light (e.g., refractors, diffusers, reflectors, etc.). Current luminaire designs often utilize mechanical fasteners to couple these optical components to the luminaire, requiring that the luminaire be of a size sufficient to accommodate installation of such fasteners and the tools necessary to do so. Moreover, the manual nature of this assembly jeopardizes the precision of the registration between the optical components, particularly when the components are mounted after the luminaire is installed. Thus, larger tolerances must be built into the fixture. These factors lead to an increase in the size of the luminaire, rendering it unsuitable for small spaces.

BRIEF SUMMARY

One aspect of the present disclosure relates lighting systems. For example, the lighting system includes an optical assembly comprising a retention ring configured to tool-lessly couple both an optic and a trim. The optic can be configured to receive light from a light source. The optic comprises an optic coupler. The trim can be configured to surround the optic and direct the light away from the light source. The trim comprises a trim coupler. The retention ring can include an optic retention element and a trim retention element. The optic retention element can be configured to tool-lessly couple with the optic coupler to couple the optic to the retention ring. The trim retention element can be spaced radially outwardly from the optic retention element, the trim retention element configured to tool-lessly couple with the trim coupler to couple the trim to the retention ring radially outwardly from the optic.

In some embodiments, the optic coupler and the optic retention element can include complimentary features to facilitate twist and lock coupling between the optic and the retention ring. The optic coupler of the optic can include at least one projecting element extending laterally outwardly from the optic; and the optic retention element of the retention ring can have an elongated shape, the elongated shape configured to support the at least one projecting element and lock the optic with the retention ring. In some embodiments, each of the optic, the trim, and the retention ring can include a central aperture on a light receiving side. The optic retention element can extend along the central aperture of the retention ring. The optic retention element can have a fixed end integrally formed with the retention ring and a free end. In some embodiments, the at least one projecting element of the optic coupler can include a raised surface portion; and the optic retention element can include a recess portion configured to receive the raised surface portion of the optic coupler. The raised surface portion of the optic coupler can be configured to deflect the optic retention element of the retention ring. The optic retention element can be configured to retract when the raised surface portion of the optic coupled is received in the recess. In some embodiments, the at least one projecting element can include a first projecting element, a second projecting element, and a third projecting element spaced from each other, the second projecting element located between the first and the third projecting elements, the second projecting element comprising the raised surface portion. In some embodiments, bottom surfaces of the first projecting element and the third projecting element can lie in the same plane, and a bottom surface of the second projecting element is offset from the bottom surfaces of the first projecting element and the third projecting element. The at least one projecting element can project substantially perpendicular to a central axis of the optic. In some embodiments, the optic coupler can include a first optic coupler and a second optic coupler located diametrically opposite to the first optic coupler and the optic retention element can include a first optic retention element and a second optic retention element.

In some embodiments, the trim coupler of the trim can include a flange including at least one hole and at least one window. The trim retention element can include a channel to receive the flange of the trim and an engagement tab adapted to engage the hole to lock the trim with the retention ring. The at least one hole of the trim can be a profiled hole, where the engagement tab of the trim retention element can include a protrusion adapted to seat at least partially within the profiled hole of the trim retention element. The trim retention element can include a first sidewall disposed on a first side of the engagement tab, and a second sidewall on a second side opposite to the first side, the second sidewall configured to abut an edge of the at least one window of the trim. In some embodiments, the flange can be an angular flange. Each of the first and the second sidewalls can have an angular edge configured to receive the angular flange within the channel of the retention ring. The engagement tab can be oriented at an angle corresponding to an angle of the angular flange. The angle of the angular flange can be in a range between 30° and 60° with respect to a horizontal axis.

Further, one aspect of the present disclosure relates to a retention ring including an optic retention element and a trim retention element. The optic and trim retention ring can include a base comprising a central aperture; an optic retention element provided proximate the central aperture of the base and comprising an elongated curved arm configured to tool-lessly twist and lock an optic to the retention ring; and a trim retention element formed on the base and radially spaced from the optic retention element, the trim retention element configured to tool-lessly twist and lock a trim to the retention ring radially outward of the optic.

In some embodiments, the curved arm of the optic retention element can include a first end fixed to the base and a free end. The curved arm can be configured to deflect relative to the base. The optic retention element can extend along the central aperture. The optic retention element can include a first flat portion at a free end, a second flat portion at the fixed end, and a recess portion between the first flat portion and the second flat portion. The recess portion of the optic retention element can be configured to receive a raised surface portion of the optic.

In some embodiments, the trim retention element can include a channel extending along an arcuate axis and configured to receive a flange of the trim; and an engagement tab adapted to seat within a hole in the flange to lock the trim with the retention ring. The engagement tab of the trim retention element can include a profiled raised surface configured to gradually move the engagement tab when engaged with the flange of the trim and configured to be received within the hole of the flange. The trim retention element can include a first sidewall disposed on a first side of the engagement tab, and a second sidewall on a second side opposite to the first side, the second sidewall configured to stop the trim from advancing when locked with the retention ring. Each of the first and the second sidewalls can include an angular edge and the channel extends between the first sidewall and the second sidewall. The engagement tab can be oriented at an angle relative to a horizontal direction. The angle can be in a range between 30° and 60° with respect to the horizontal direction. The optic retention element can be offset by an angle in a range between 30° and 60° from the trim retention element.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and can or cannot represent actual or preferred values or dimensions. Where applicable, some or all features cannot be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) can be practiced without those specific details. In some instances, well-known structures and components can be shown in block diagram form in order to avoid obscuring the concepts of the disclosed subject matter.

The present disclosure provides an optical assembly that includes a single component (e.g., a retention ring) to which an optic and a trim are coupled. The optical assembly may be provided in a luminaire. The retention ring is attached to the luminaire and the optic and trim attached to the retention ring. In some embodiments, features on the retention ring engage corresponding features on the optic and on the trim such that the optic and trim can be mounted on the retention ring without the use of separate fasteners and tools. This can be particularly advantageous for tight spaces (e.g., recesses) available for luminaires. Furthermore, use of the retention ring leads to more precise and consistent mounting of these components on the luminaire (and more particularly with respect to the light sources). As such, when multiple luminaires are present, each luminaire can provide similar light distribution. Thus, the retention ring can provide efficient and tool-less mounting system for small spaces.

Figure 1:
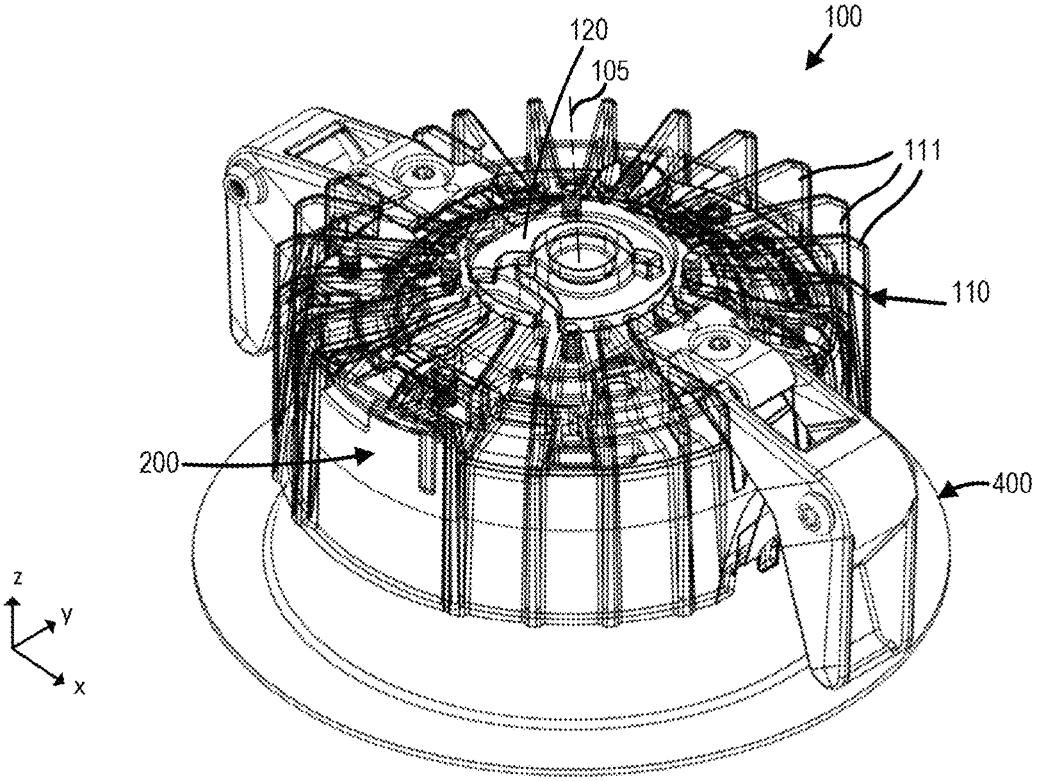
FIG. 1 illustrates a top perspective view of an embodiment of a luminaire in which embodiments of the optical assembly described herein may be used.

FIG. 1 illustrates an embodiment of a luminaire 100 in which embodiments of an optical assembly disclosed herein may be used. More specifically, the luminaire 100 is a recessed luminaire provided with mounting arms that retain the luminaire within an aperture in a ceiling. The luminaire also includes one or more light sources 120 and a chassis 110 on which the light sources 120 are mounted and supported within the luminaire 100. The light sources 120 are illustrated as a plurality of light emitted diodes arranged in any number and/or pattern on a printed circuit board ("PCB"). The LEDs may be single-die or multi-die LEDs, DC or AC, or can be organic light emitting diodes. White, color, or multicolor LEDs may be used. Moreover, the LEDs need not all be the same color; rather, mixtures of LEDs may be used. However, other light sources may be used. The chassis 110 may be formed of any material having suitable structural integrity and rigidity, including polymeric and metallic materials. In some embodiments, the chassis 110 formed from materials also having suitable thermal management capabilities so as to conduct heat generated by the light sources 120. Metallic materials, such as but not limited to steel and aluminum, may be particularly suitable. Heat sink fins 111 may be, but do not have to be, provided on the chassis 110. It should be understood that FIG. 1 represents merely an example of a luminaire 100 in which embodiments of the optical assembly disclosed herein may be used. Luminaires of other types and/or geometries are contemplated herein.

Figure 2:
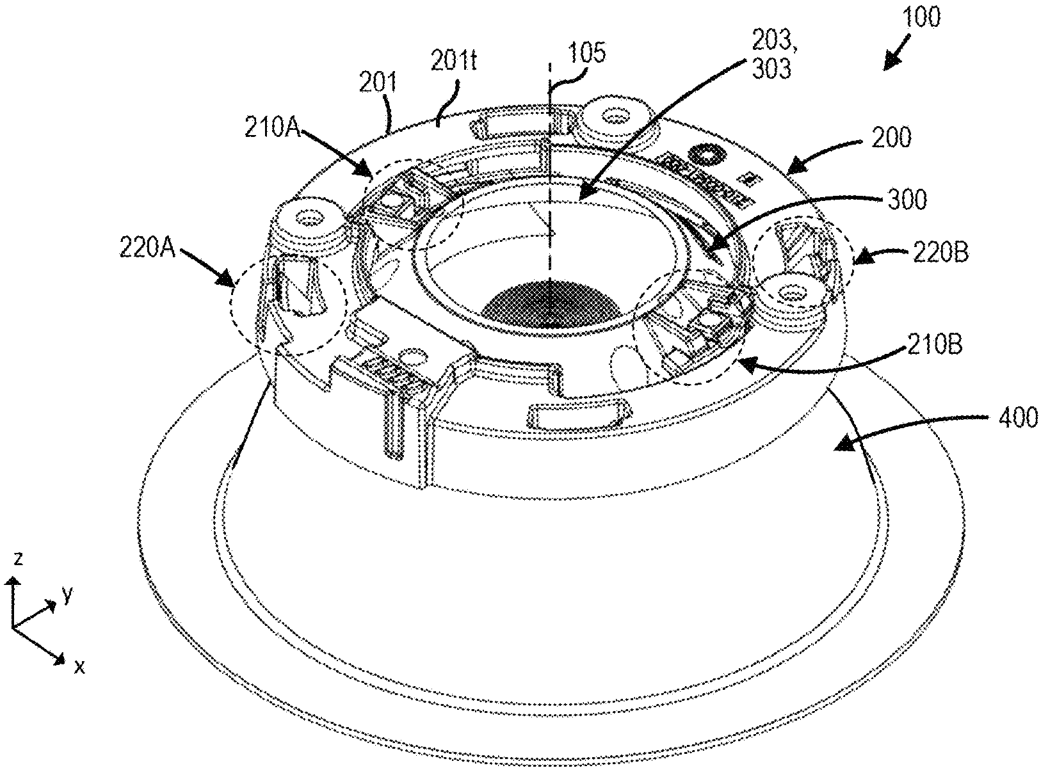
FIG. 2 illustrates a top perspective view of an embodiment of an optical assembly shown in isolation.
Figure 3:
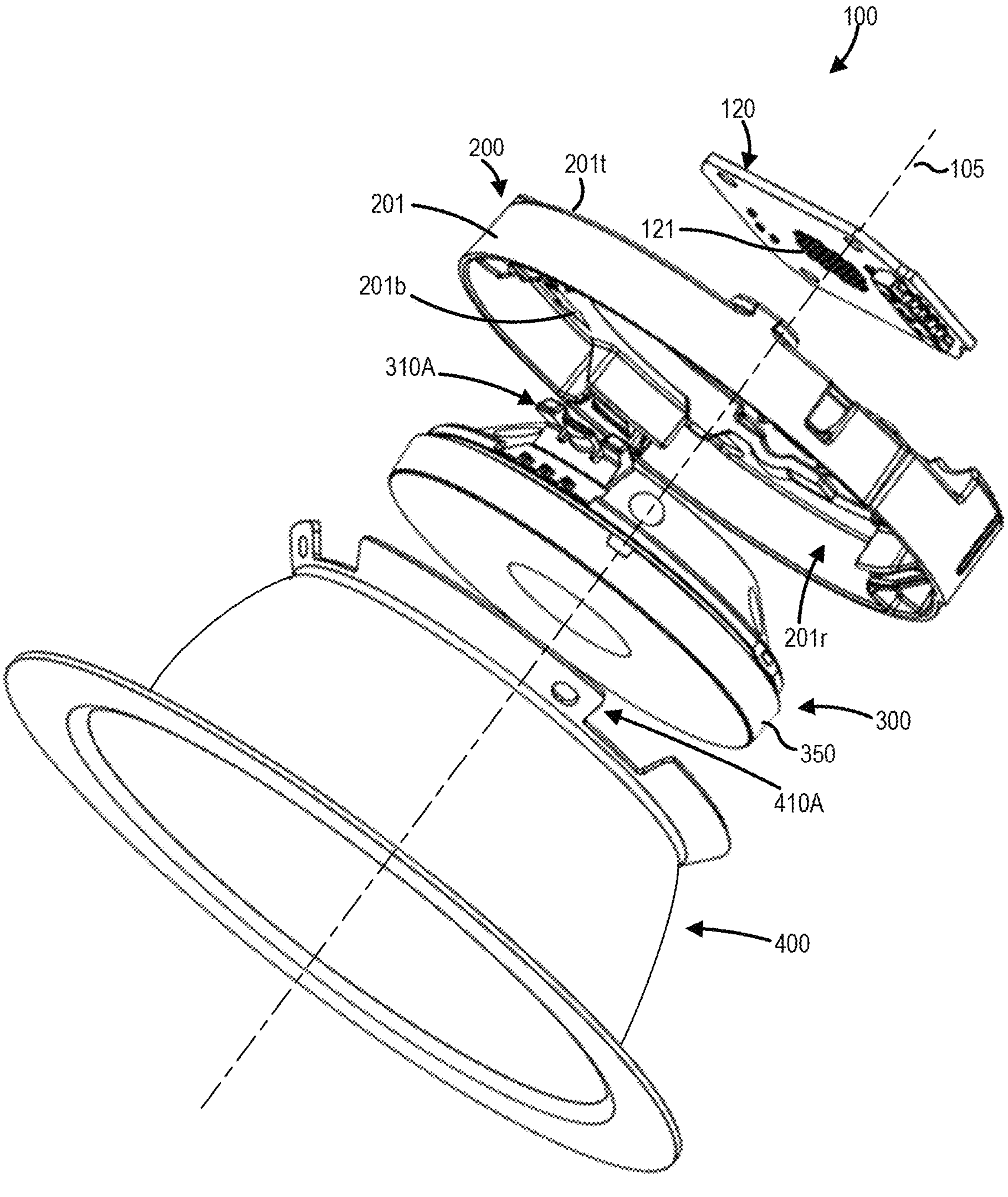
FIG. 3 illustrates an exploded view of the optical assembly of FIG. 2 shown with a light source, according to various embodiments.

FIGS. 2 and 3 illustrate one embodiment of an optical assembly 100. The optical assembly 100 includes a retention ring 200 and one or more optical components (e.g., optic 300 and trim 400) coupled to the retention ring 200. In use, the retention ring 200 is mounted to the chassis 110 and supports the optic 300 and trim 400 within the luminaire 100. The optical components (e.g., 300, 400) can receive light from the light source 120 and direct the light downward from the luminaire 100. In some embodiments, the light source 120 and the optical assembly 100 components (e.g., 200, 300, 400) can be aligned axially along an optical or center axis 105 (see FIG. 3).

FIG. 2 and FIG. 3 illustrates an assembled view and an exploded view, respectively, of optical assembly 100. The optical assembly 100 can include the retention ring 200, an optic 300, and a trim 400. The retention ring 200 can be configured to receive and tool-lessly couple with both the optic 300 and the trim 400. For example, the retention ring 200 and the optic 300 can include complementary optic coupling features (e.g., 210A, 310A discussed in detail later in the disclosure) configured to facilitate twist and lock relative to each other. The retention ring 200 and the trim 400 can include complementary trim coupling features (e.g., 220A, 410A discussed in detail later in the disclosure) configured to twist and lock relative to each other.

Figure 7A:
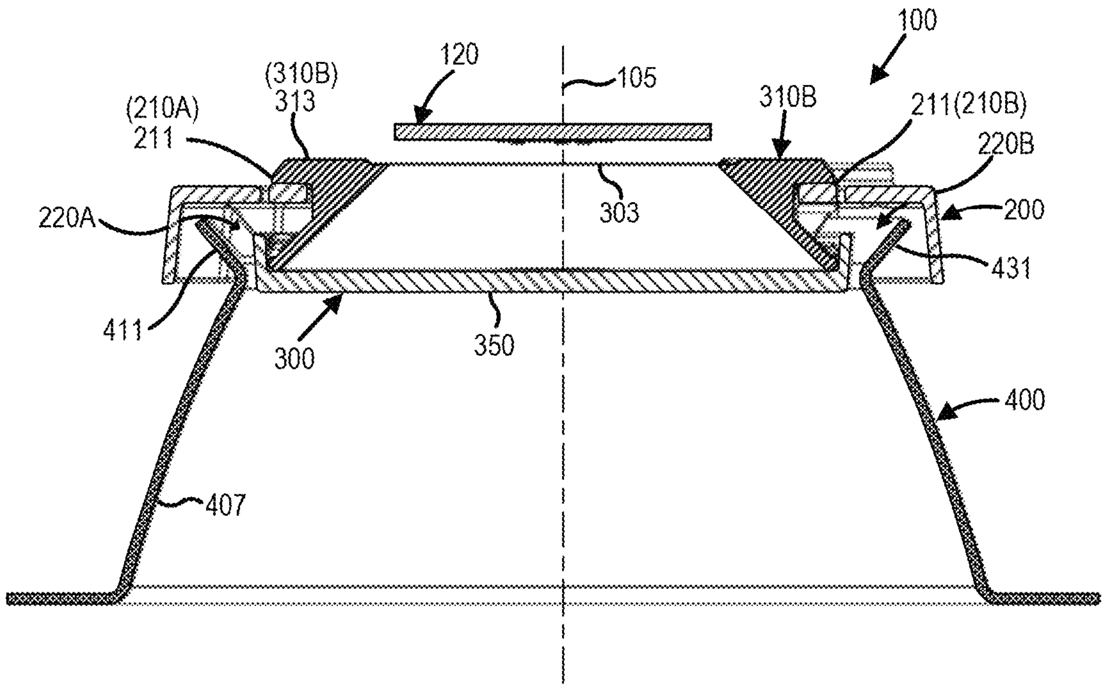
FIG. 7A illustrates a cross-sectional elevation view of an embodiment of an assembled optical assembly.
Figure 7B:
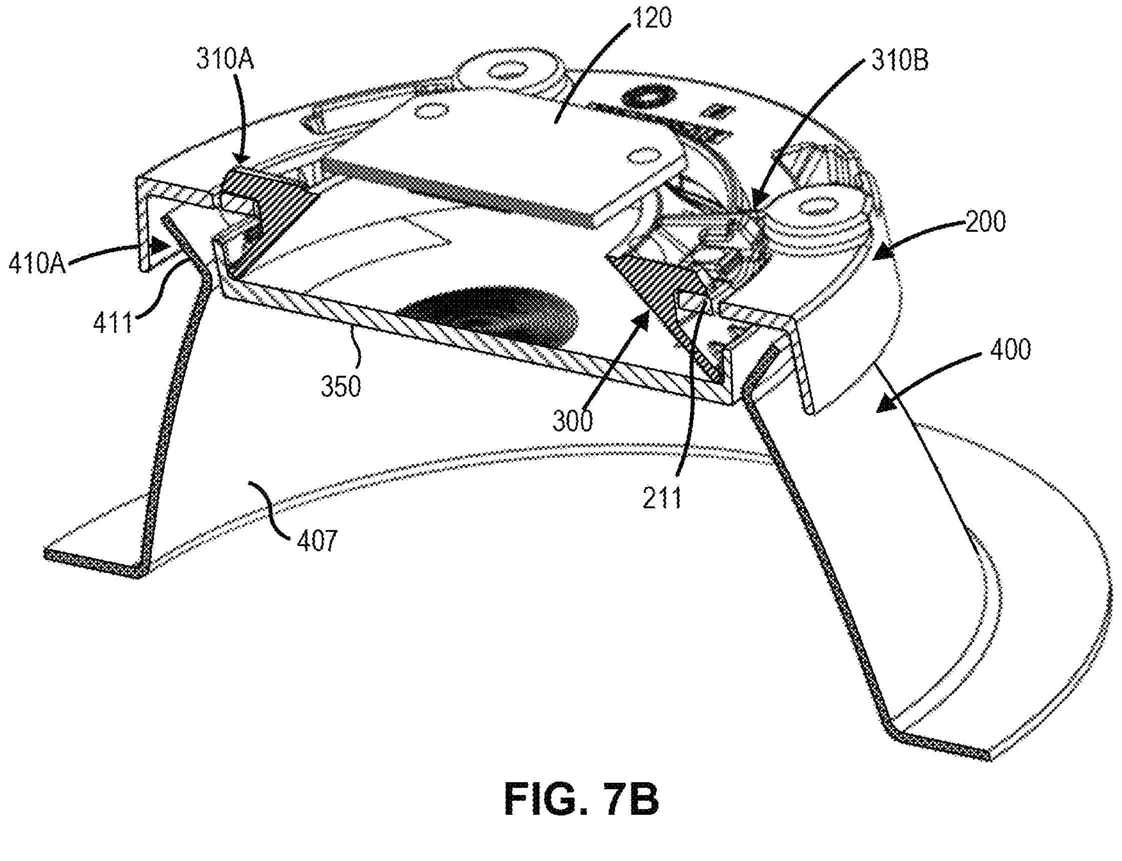
FIG. 7B illustrates a cross-sectional perspective view of the assembled optical assembly of FIG. 7A.

The retention ring 200, the optic 300, and the trim 400 can be at least partially nested into and/or around each other (e.g., best seen in FIGS. 2, 7A, and 7B). In the illustrated embodiments, the top portions of the optic 300 and the trim 400 can be disposed within the retention ring 200 to provide a compact mounting arrangement. Each of these components 200, 300, 400 can include an opening or an aperture at a light receiving side (e.g., a top side) and a light emitting side (e.g., a bottom side). The components 200, 300, and 400 can be axially aligned along the optic or center axis 105. In the illustrated embodiments, the optic 300 can be disposed radially inward relative to the trim 400 (i.e., more proximate the optical axis 105), and the trim 400 can be disposed radially outward relative to the optic 300 (i.e., more distal the optical axis 105). Accordingly, light can be received from the light source 120 on the top side and directed within the optic 300 and the trim 400. The optic 300, the trim 400, or a combination thereof can be configured to create a desired light distribution, which can be emitted through the bottom side opening of the optical assembly 100. For example, the optic 300 and/or the trim 400 can include reflective coating, light shaping features, a lens, or other optical features.

Referring to FIGS. 2, 3, and 4A-4D, the retention ring 200 can have a body or a base 201 with an aperture or opening 203 through which light from the light source 120 passes. For example, the light source 120 can include an array of LEDs 121 (see FIGS. 3 and 4A) mounted on a printed circuit board. The LEDs 121 can be positioned within or aligned with the aperture 203 to direct the light downward through the base 201. The base 201 of the retention ring 200 can have a cylindrical shape (e.g., see FIG. 4B), conical shape, or other shapes compatible with a recess in a mounting surface (e.g., a ceiling or a side wall).

In some embodiments, the base 201 of the retention ring 200 can include a top wall 201*t* in which aperture 203 is defined and a least one side wall 201*w* extending downwardly from the top wall 201*t*. The top wall 201*t* and side wall 201*w* collectively define a recess 201*r* (see FIG. 3) in the base 201. The top wall 201*t* of the base 201 can include mounting features such as screw holes to attach the retention ring 200 to the chassis 110 (in FIG. 1) and/or to mount the retention ring 200 to another mounting surface (e.g., a ceiling, a wall, or a recess therein).

Retention features may be provided in the recess 201*r* of the base 201 and can be configured to tool-lessly couple an optic (e.g., 300) and/or a trim (e.g., 400) to the retention ring 200. In some embodiments, a bottom surface 201*b* of the top wall 201*t* can include indicia (e.g., R1 and R2) indicating a direction of rotation (e.g., clockwise or anticlockwise) for locking and unlocking an optic (e.g., 300) and a trim (e.g., 400) with respect to the retention ring 200. Other indicia may also be included to further assist with aligning the optic and/or the trim with the retention features of the retention ring 200.

The recess 201*r* (see FIGS. 4B and 4C) of the retention ring 200 can be sized to receive the top portions of the optic 300 and the trim 400. For example, the recess 201*r* can have a depth D (e.g., see FIG. 4C) measured as a distance between the bottom surface 201*b* and the bottom edge 201*e* of the side wall 201*w*. The retention features can be contained within the recess 201*r*. In other words, the retention features do not project out from the recess 201*r*. The recess 201*r* can prevent light leakage from an interface between the retention ring 200, and the optic 300 and/or the trim 400.

The side wall 201*w* can be extend around a periphery of the retention ring 200. The side wall 201*w* can be approximately cylindrical, conical, or other shapes. The side wall 201*w* can serve as a bounding surface or a side wall of the recess 201*r*. The side wall 201*w* can extend downward from the top wall 201*t* and beyond the bottom surface 201*b*. The side wall 201*w* can include an interior surface 201*s* (see FIG. 4B) on which at least a portion of a mounting or retention feature can be formed.

In some embodiments, the retention ring 200 can include one or more retention features (e.g., 210A, 210B, 220A, 220B) formed on the bottom surface 201*b*, the interior surface 201*s* of the side wall 201*w*, or a combination thereof. In the illustrated embodiment, the retention features (e.g., 210A, 210B) can be optic retention elements and the retention features (e.g., 220A, 220B) can be trim retention features. These retention features (e.g., 210A, 210B, 220A, 220B) of the retention ring 200 and corresponding features on the optic 300 and the trim 400 can be characterized as tool-less twist and lock system for mounting the optic 300 and the trim 400. However, other tool-less mounting features (e.g., snap fit) are possible. Thus, a tool such as a screwdriver, wrench, or other fastening tools are not required during assembly of the optic and/or the trim with the retention ring 200. The retention features herein provide a compact and consistent mounting means in tight spaces. In other words, a large operating envelope is not required, and the optical components 300, 400 can be consistently mounted (e.g., characterized by orientation and/or positioning) with respect to each other, the retention ring 200, and the light source 120.

Figure 4A:
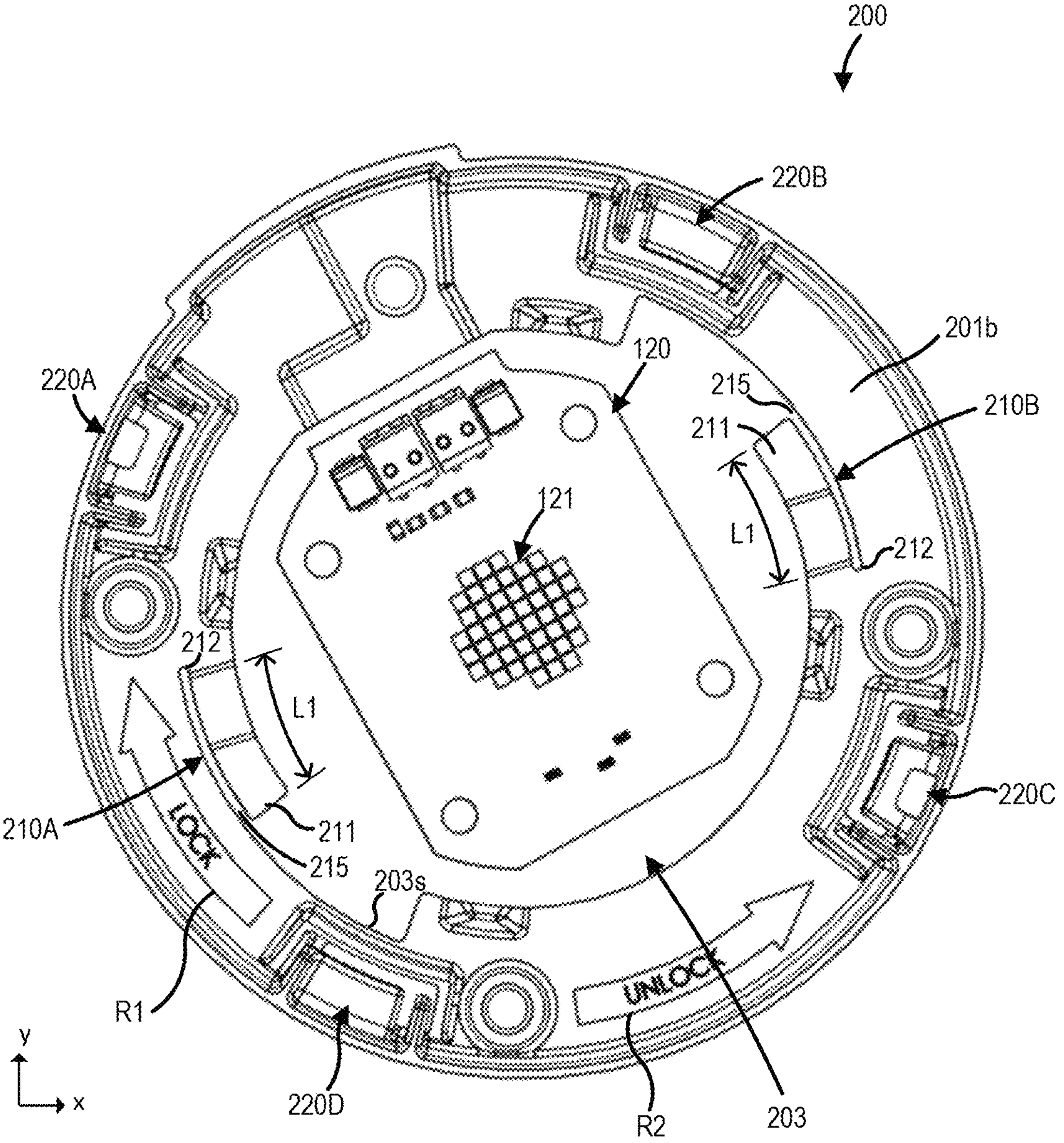
FIG. 4A illustrates in isolation a bottom plan view of the retention ring of the optical assembly of FIG. 3, according to various embodiments.
Figure 4B:
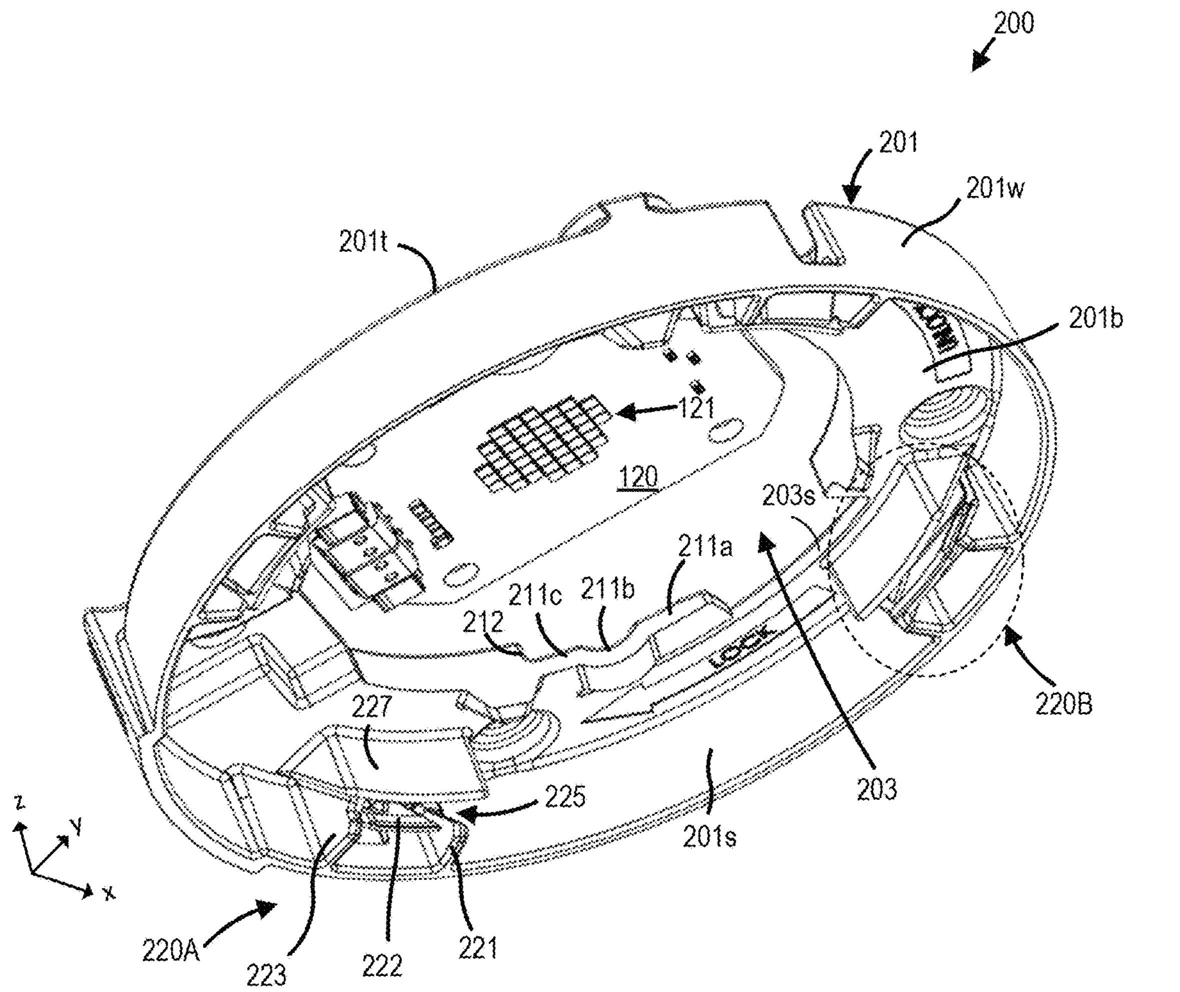
FIG. 4B illustrates a bottom perspective view of the retention ring of FIG. 4A.
Figure 4C:
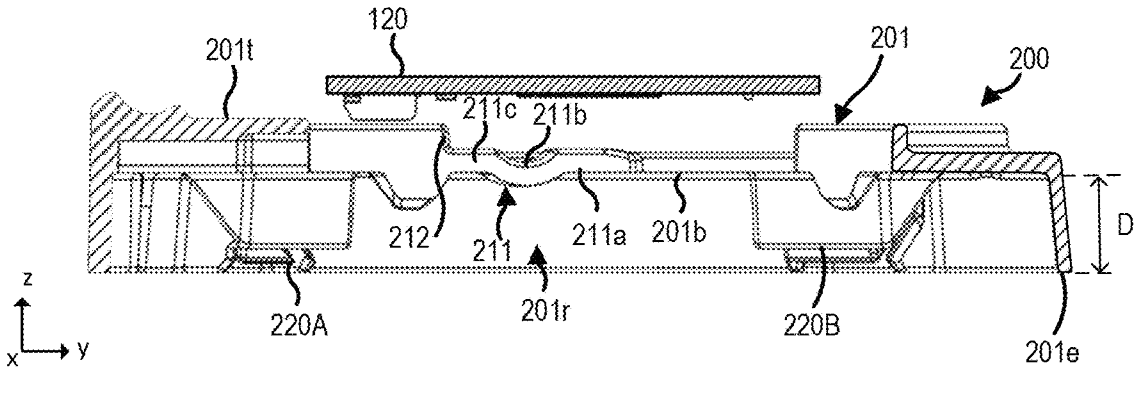
FIG. 4C illustrates a cross-sectional elevation view of the retention ring of FIG. 4A.

Referring to FIG. 4A through 4C, the optic retention elements 210A, 210B can be configured to tool-lessly coupling with the optic 300 and lock the optic 300 with the retention ring 200. In the illustrated embodiment, the optic retention elements 210A and 210B can be the same. However, variations in the optic retention elements 210A and 210B may be possible. Two optic retention elements 210A and 210B are illustrated and shown to be located diametrically opposite to each other on the retention ring 200. However, more than two optic retention elements may be used and provided at various locations on the retention ring 200.

As illustrated, an optic retention element 210A (and similarly 210B) can be formed on the bottom surface 201*b* of the base 201. The optic retention element 210A can be an elongated strip 211 e.g., having an elongated curved shape. The optic retention element 210A can extend along the central aperture 203 of the retention ring 200. For example, the elongated strip 211 can have a length L1 (illustrated in FIG. 4A) extending along a curved portion of the central aperture 203. The elongated strip 211 can be inwardly offset from an inner edge 203*s* of the aperture 203 to include a curved space 215 (illustrated in FIG. 4A) between the optic retention element 210A and the inner edge 203*s* of the aperture 203.

Figure 5A:
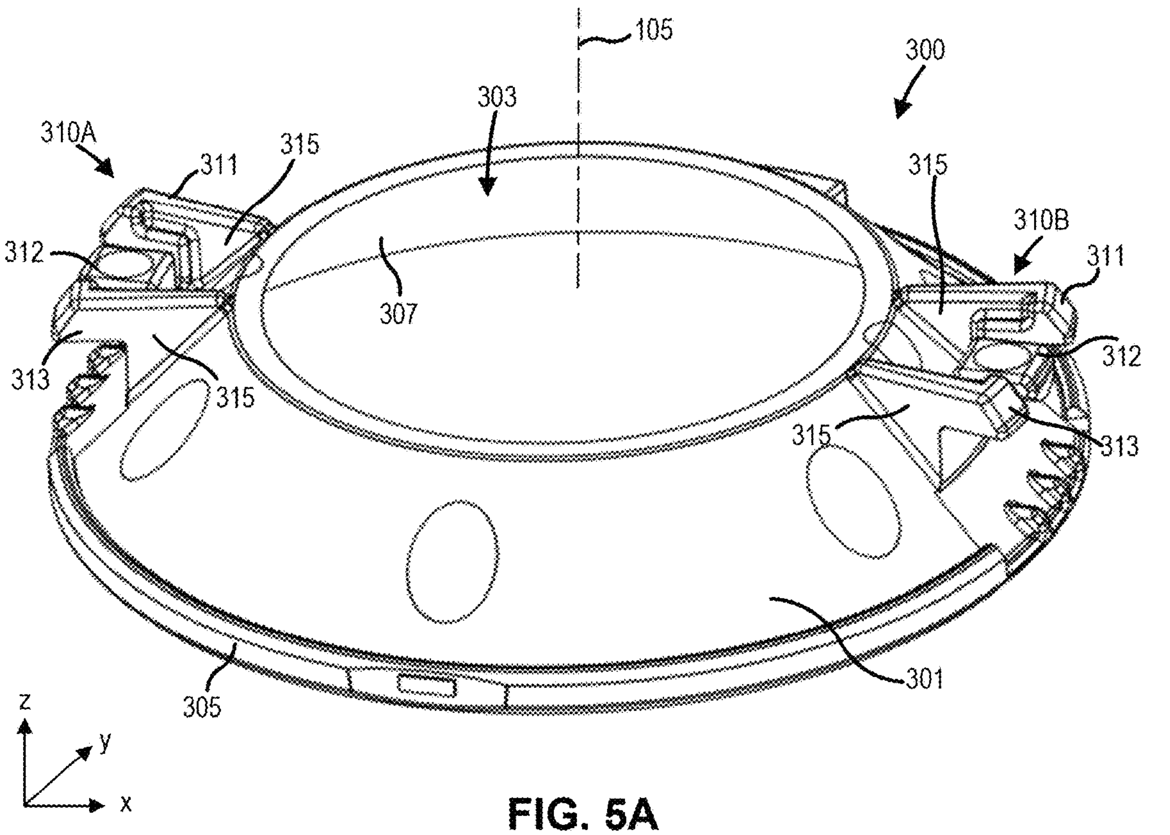
FIG. 5A illustrates in isolation a top perspective view of the optic of the optical assembly of FIG. 3.
Figure 5B:
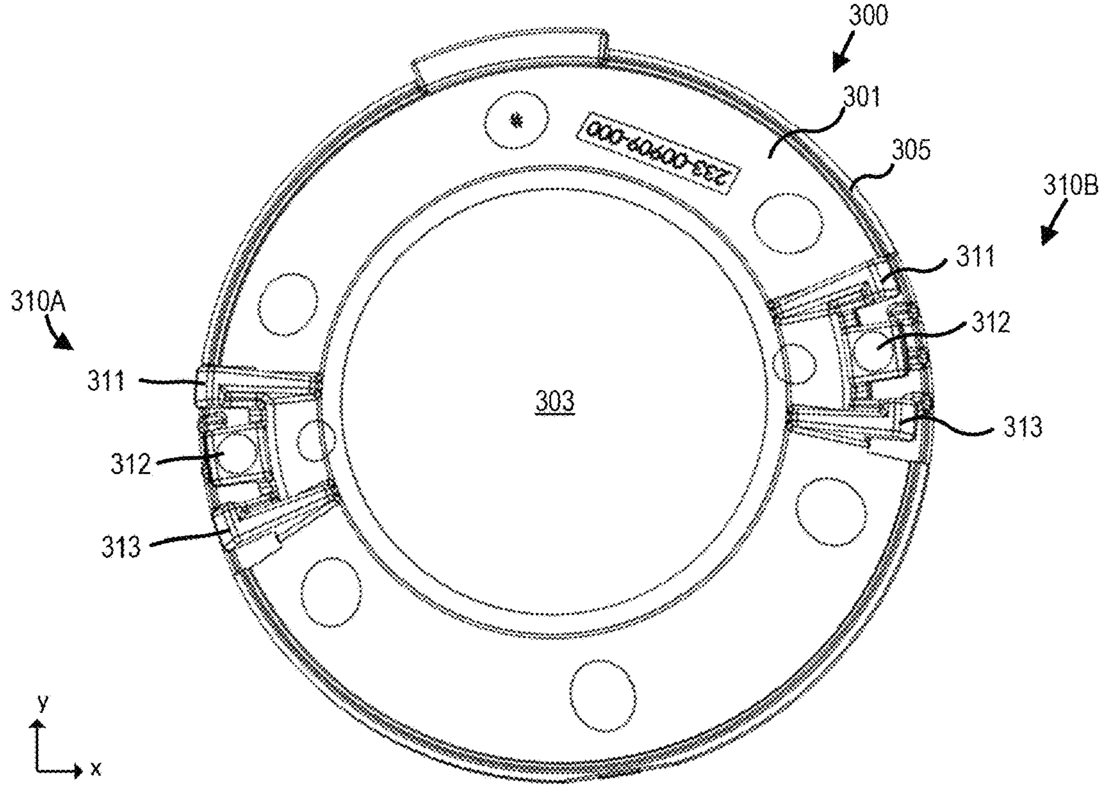
FIG. 5B illustrates a top plan view of the optic of FIG. 5A.

Referring to FIGS. 4B and 4C, the optic retention element 210A can be divided into a first portion 211*a*, a second portion 211*b*, and a third portion 211*c*. The first portion 211*a* and the third portion 211*c* can include flat top surfaces. The second portion 211*b* can be located between the first portion 211*a* and the third portion 211*c*. The second portion 211*b* can include a recess portion configured to receive a raised surface portion of the optic coupler (e.g., 310 in FIGS. 3 and 5A) of an optic (e.g., 300). The first portion 211*a* and the third portion 211*c* can support the optic coupler and the second portion 211*b* can facilitate locking of the optic (e.g., 300) with the retention ring 200.

The optic retention element 210A can be cantilevered or spring loaded such that the elongated strip 211 can move with respect to the bottom surface 201*b* of the retention ring 200 when engaging or assembling the optic (e.g., 300). For example, the strip 211 can be cantilevered such that the first portion 211*a* can include a free end and the third end portion 211*c* can include a fixed end. The fixed end of the portion 211*c* can be fixed to or integrally formed with the top wall 201*t*. The top wall 201*t* can also provide a mechanical stop (e.g., a vertical wall 212 in FIGS. 4B and 4C)) to prevent the optic from advancing. When a force is applied (e.g., by the optic couplers of the optic 300) at the free end or the first portion 211*a*, the strip 211 can move relative to the retention ring 200. For example, the first portion 211*a* can flex or move down in a vertical direction and retract when the optic is turned and locked in position with respect to the retention ring 200. An example of engagement and disengagement of the optic (e.g., 300) is further discussed in detail with respect to FIGS. 7A-7B and 8A-8B.

Figure 4D:
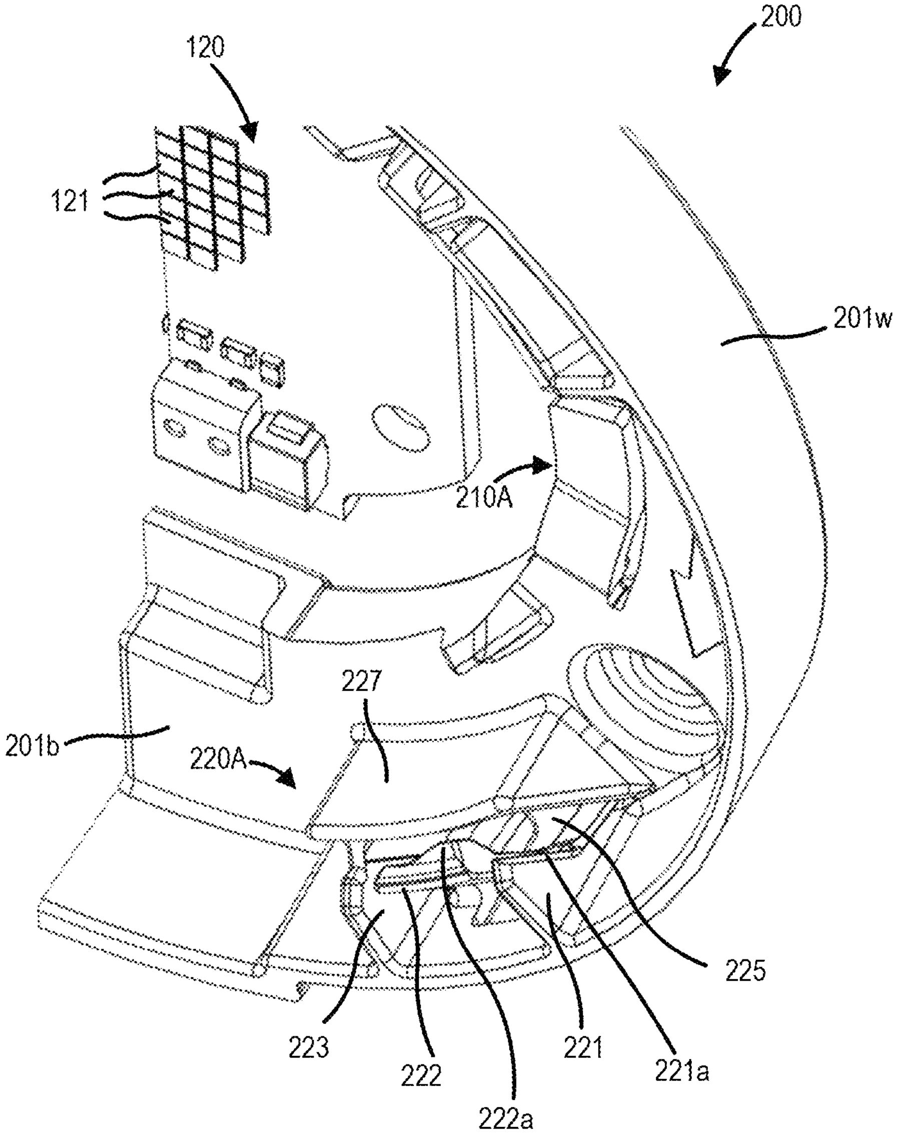
FIG. 4D illustrates a partial bottom perspective view of the retention ring of FIG. 4A.

Referring to FIGS. 4A, 4B and 4D, the retention ring 200 includes the trim retention elements 220A-220D. The trim retention element 220A (and similarly 200B-220D) can be formed on the bottom side of the base 201 and spaced radially outwardly from the optic retention element 210A. The trim retention element 220A can include an engagement tab 222 configured to engage with and lock the trim (e.g., 400) in place. For example, the engagement tab 222 can include a portion receivable in a hole in the trim to lock the trim with the retention ring 200. The engagement tab 222 can be flexible and move against the force exerted by the trim (e.g., 400) during assembling. For example, the engagement tab 222 can be cantilevered with a fixed end extending from the inner surface 203*s* of the sidewall 201*w* or from the bottom surface 201*b* of the base 201.

In some embodiments, the engagement tab 222 can include a profiled raised surface 222*a* (see FIG. 4D) configured to gradually deflect or move the engagement tab when engaging or disengaging with the trim (e.g., 400). In the illustrated embodiment, the profiled raised surface 222*a* can have a bell-shaped or ramp-like profile configured to be received within the hole of the trim. The assembly of the trim with the retention ring 200 is further discussed in detail with respect to FIGS. 7A-7B and 9A-9B.

The trim retention element 220A can include a first sidewall 221, a second sidewall 223, and a front wall 227 more proximate the aperture 203. The first sidewall 221 can be disposed on a first side of the engagement tab 222, and the second sidewall 223 on a second side of the engagement tab 222 opposite the first side. The second sidewall 223 can be configured to stop the trim 400 from advancing when locked with the retention ring 200. For example, the second sidewall 223 can extend from the inner surface 201*s* of the base 201 to the front wall 227. This way, the trim 400 can be consistently installed with respect to the retention ring 200. The front wall 227 can extend from the bottom surface 201*b* of the base 201 and extend in front of edges of the sidewall 221, 223.

The trim retention element 220A can include a channel 225 (see FIGS. 4B and 4D) configured to receive a portion (e.g., a flange) of the trim (e.g., 400). The channel 225 is defined by and extends between the first sidewall 221, the second sidewall 223, and the front wall 227. The channel 225 can be a space between the front wall 227 and the edges of the sidewalls 221, 223. The channel 225 can be open at an edge 221*a* (see FIG. 4D) of the first sidewall 221 and closed at the second sidewall 223.

In some embodiments, the first sidewall 221 can include an angular edge (e.g., 221*a* of the first sidewall 221 in FIG. 4D). The channel 225 can be angular with respect to the bottom surface 201*b* and extends between the first sidewall 221 and the second sidewall 223. The engagement tab 222 is oriented at an angle relative to the bottom surface 201*b* of the base 201. The angle can be in a range between 30° and 60° with respect to the inner surface 203*s* of the sidewall 201*w* or the bottom surface 201*b*.

The illustrated embodiments show four trim retention elements 220A-220D. However, two, three, or a greater number of retention elements may be provided without limiting the scope of the present disclosure. Each of trim retention elements (e.g., 220A-220D) can be the same and equally spaced from each other. However, minor variations are possible. For example, the engagement tab 222 can be provided only on one, two, or three trim retention elements. As another example, the engagement tabs 222 can only be provided on diametrically opposite trim retention elements. In the illustrated embodiment, the trim retention elements 200A-220D are spaced approximately 90 degrees apart. In some embodiments, the trim retention elements may have minor variations in shape and sizes without deviating from assembly and disassembly of the process discussed herein.

FIGS. 5A-5D illustrate an optic 300, according to various embodiments. The optic 300 can include an optic body 301 having an aperture 303 for receiving light from the light source (e.g., 120 in FIG. 3). The optic body 301 can include one or more optic couplers (e.g., 310A, 310B) configured to tool-lessly couple the optic 300 with the retention ring 200 (e.g., see FIGS. 2, 3, and 4A-4D). As an example, a first optic coupler 310A can be located diametrically opposite to a second optic coupler 310B. The optic couplers 310A and 310B can have the same construction. However, minor variations in optic couplers 310A and 310B are possible without affecting the twist and lock system. The optic coupler 310A (and similarly 310B) can include structural elements complimentary to the retention features (e.g., 210A in FIGS. 4A-4D) of the retention ring (e.g., 200 in FIG. 4A-4D) to facilitate twist and lock coupling between the optic 300 and the retention ring (e.g., 200).

In some embodiments, the optic coupler 310A can include at least one projecting element extending laterally outwardly from the optic body 301. In the illustrated embodiment, the at least one projecting element can include a first projecting element 311, a second projecting element 312, and a third projecting element 313. In some embodiments, the at least one projecting element (e.g., one or more of elements 311, 312, 313) can extend outwardly from the optical body 301 in a direction perpendicular (e.g., along x-axis in FIG. 5C) to the optical or central axis 105 of the optic 300. For example, each of the projecting elements 311, 312, and 313 can extend perpendicularly with respect to the central axis 105.

Figure 5C:
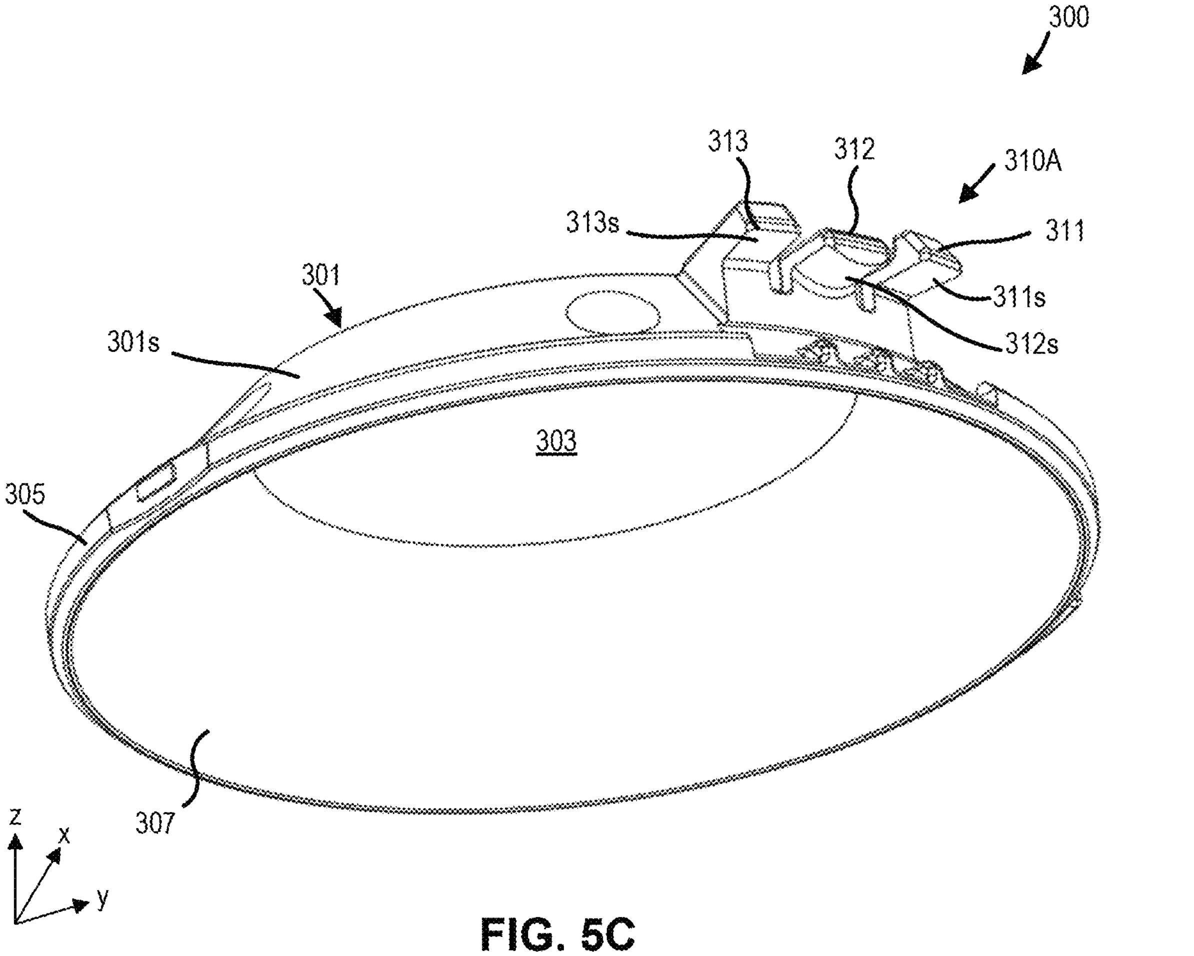
FIG. 5C illustrates a bottom perspective view of the optic of FIG. 5A.
Figure 5D:
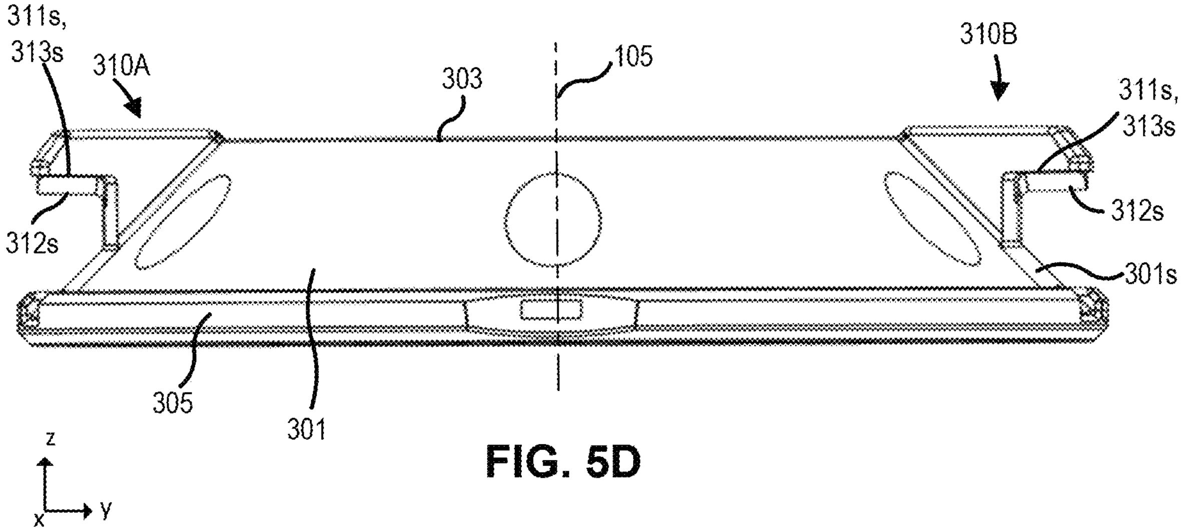
FIG. 5D illustrates a side elevation view of the optic of FIG. 5A.

In some embodiments, the at least one projecting element of the optic coupler 310A can include a raised surface portion. For example, as shown in FIGS. 5C and 5D, the second projecting element 312 can include a raised surface portion 312*s*. The raised surface portion 312*s* can be a profiled surface configured to gradually move the optic retention element (e.g., 210A in FIGS. 4B and 4C) of the retention ring (e.g., 200). When the raised surface portion 312*s* of the optic coupler 312 is received in the recess (e.g., 211*b*) of the optic retention element (e.g., 210A), the optic retention element retracts and locks the optic 300 with the retention ring (e.g., 200).

In many embodiments, the first projecting element 311 and the third projecting element 313 can include flat bottom surfaces 311*s*, 313*s* (see FIG. 5C, 5D) extending in the same plane. A bottom surface 312*s* of the second projecting element 312 can be offset from the bottom surfaces 311*s*, 313*s*, of the first projecting element 311 and the third projecting element 313.

In some embodiments, the optic body 301 can have a truncated conical or frustoconical shape having an inclined outer surface 301*s* (see FIG. 5D). The optic couplers 311, 312, 313 can have a base 315 integrally formed with the outer surface 301*s* and can be inclined. The present disclosure is not limited to a conical shaped optic body 301, and other shapes e.g., cylindrical, prismatic, polygonal, etc. are possible. In some embodiments, the optic body 301 can be symmetrical about the central axis 105. However, the optic body 301 may also be configured to be asymmetrical.

The optic body 301 can include an interior surface 307 configured to control (e.g., direct and/or shape) the light to generate a desired light distribution. For example, the interior surface 307 can include a reflective surface or light shaping features. In some embodiments, the optic body 301 can include a lens attachment surface 305 at a lower end of the optic 301. The lens attachment surface 305 can be configured to couple a lens 350 (e.g., shown in FIG. 3). For example, the lens attachment surface 305 can include snap fitting elements, threads, screw holes or other fastening means. In some embodiments, the lens (e.g., 350) can include optic shaping features (e.g., facets) configured to generate a desired light distribution, reduce glare, etc.

In some embodiments, the optic 300 can be made of fiberglass, or plastic.

Figure 6:
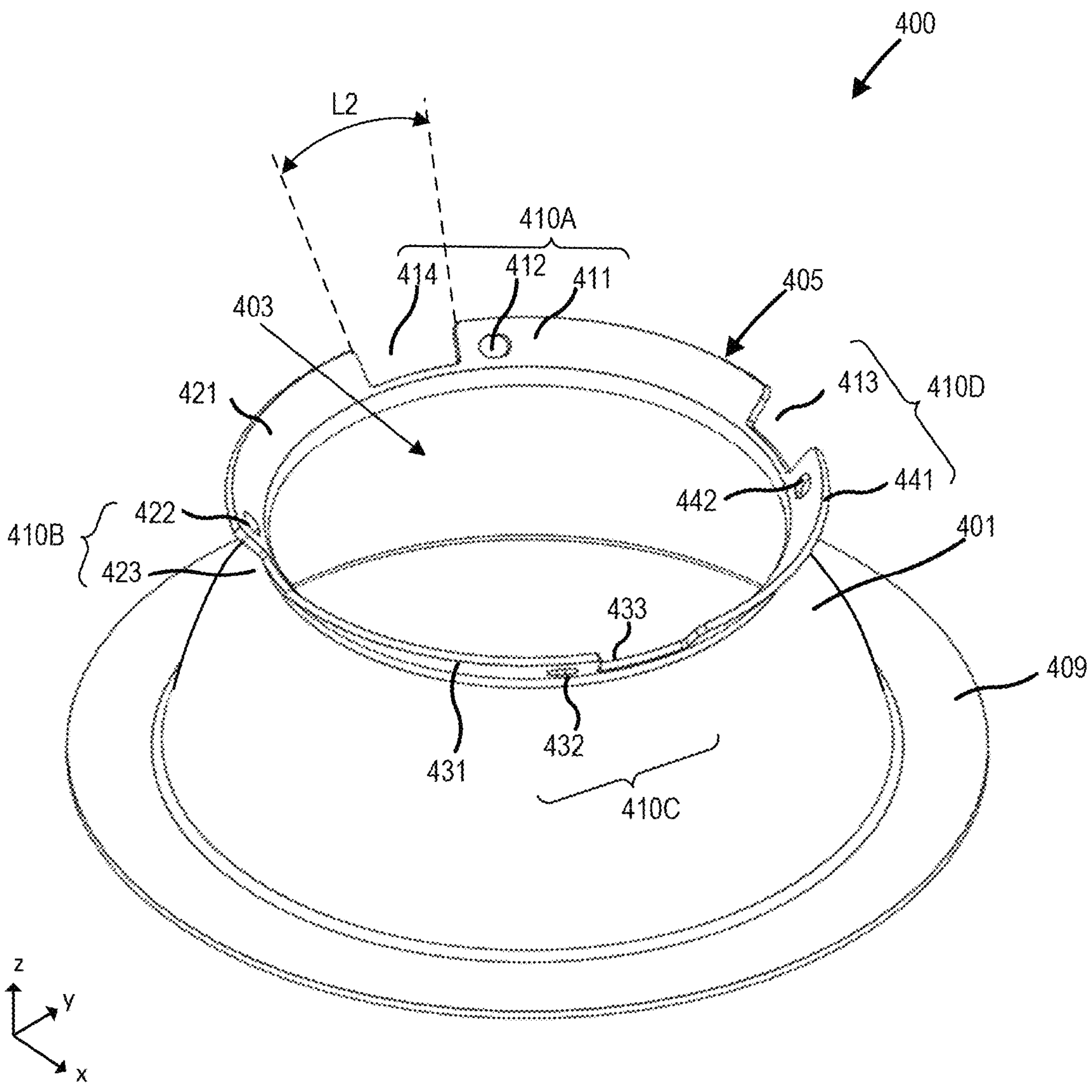
FIG. 6 illustrates a top perspective view of the trim of the optical assembly of FIG. 3.

FIG. 6 illustrates a trim 400, according to various embodiments. The trim 400 can include a trim body 401 configured to tool-lessly couple with the retention ring (e.g., 200). For example, the trim body 401 can include one or more trim couplers (e.g., 410A, 410B, 410C, 410D). The trim couplers can be structurally the same or similar and include complimentary features corresponding to the trim retention elements (e.g., 220A-220D) of the retention ring (e.g., 200).

In some embodiments, the trim coupler can include a flange 405 formed on a upper side of the trim 400. The trim coupler can include at least one hole 412 provided in the flange 405 and at least one window 414 to facilitate positioning and locking of the trim 400 with respect to the retention ring (e.g., 200). In the illustrated embodiment, the flange 405 can be divided to form multiple trim coupling portions e.g., a combination of windows (e.g., 413, 414, 423, 433) and flange portions (e.g., 411, 421, 431, and 441). As an example, a trim coupler 410A can include a flange portion 411 including a hole 412, and a window 414. The hole 412 can be a profiled hole. For example, the profiled hole 412 can be an elongated slot, and/or include profiled edges to facilitate engagement and disengagement with respect to an engagement tab (e.g., 222) of the trim retention element (e.g., 220A). The hole 412 can be shaped to receive a profiled raised surface (e.g., 222*s*) of the engagement tab (e.g., 222) and lock the trim 400 with respect to the retention ring (e.g., 200). The holes 422, 432, and 442 of the flange portions 421, 431, and 441, respectively, can be same as or different than the hole 412.

In some embodiments, the flange 405 can be an angular flange. Accordingly, each of the flange portions e.g., 411, 421, 431, and 441 can be angular. An angular flange can provide a compact assembly compared to a horizontally flat flange. For example, the angular flange can facilitate compact sizing of and assembly with the retention ring (e.g., 200) around the optic retention features (e.g., 210A). In some embodiments, an angle of the angular flange 405 can be in a range between 30° and 60° with respect to a horizontal axis (e.g., x-axis).

In some embodiments, the flange 405 can be divided such that each of the windows (e.g., 413, 414, 423, 433) have the same arcuate length. For example, the window 414 can have an arcuate length L2. The window length L2 can correspond to an arcuate length of the trim retention element (e.g., 220A) of the retention ring (e.g., 200). Each of the windows (e.g., 413, 414, 423, 433) can serve as positioning members and can provide a mechanical stop for the trim 400 when coupling it with the retention ring. As such, the trim 400 can be consistently mounted with respect to the optic (e.g., 300) and the trim retention elements.

Although FIG. 6 illustrates same structure of retention elements, minor variations in trim retention elements are possible. For example, holes may be omitted in at least one of the trim retention elements, the holes may have different shapes, a window size may be varied, indents may be provided instead of holes, a number of retention elements may be two or more, or other changes that does not affect the twist and lock operation of the trim 400 with the retention ring 200.

The trim body 401 can include an interior surface 407 configured to control (e.g., direct and/or shape) the light to generate a desired light distribution. For example, the interior surface 407 can include a reflective surface or light shaping features. In some embodiments, the trim 400 can include a bottom flange 409 that can be used to retain the trim against an installation surface, for decorative purposes, or other purposes.

In various embodiments, the trim can offer multiple painting and plating options and may utilize steel or iron materials. The trim can be open or can comprise a lens, filter, or other optic, optical element, or optical system, for example. In various embodiments, the trim may be composed of a plastic, aluminum, or other material. In some embodiments, a family of trim shapes and finishes can be manufactured including the trim retention features herein to readily install, position, and replace it in a luminaire.

Some applications such as recessed light systems, trims can be employed to reflect light from the light source (e.g., 120) and/or the optic (e.g., 300) in a particular desired direction, such as downward from a ceiling, or towards a wall or display. In some applications, the lighting system (e.g., luminaire) may be installed in a particular orientation. Hence, the trims herein are configured such that when installed in the luminaire at a later time, the trim is in a proper orientation to direct the light in the desired direction.

FIGS. 7A and 7B illustrate cross-section views of the assembled optical assembly 100. In some embodiments, the optic 300 can be sized to fit entirely within the recess of the retention ring 200 or protrude slightly from the recess (e.g., 201*r*). The trim 400 can be sized and positioned to extend substantially downwardly from optic 300 to receive light exiting from the optic 300 and/or its lens 350 and control (e.g., directed and/or reflect) the light via inner surface 407 in a desired direction.

The illustrated cross-section views show relative disposition of coupling elements (e.g., 210A, 210B, 310A, 310B, 220A, 220B, 410A and 410B) of the retention ring 200, the optic 300 and the trim 400. As shown, the optic 300 can be positioned within a recess of the retention ring 200 and retained via the optic coupling elements 310A, 310B and 210A, 210B. The trim 400 can disposed radially outward around the optic 300 and retained via the trim coupling elements 410A, 410B and 220A, 220B. Both the optic 300 and the trim 400 can be coupled to the bottom of the retention ring 200 within a recess. This way, a compact and easy assembly of the optical assembly can be achieved. The coupling mechanisms can facilitate assembling and disassembling of the optic 300 and the trim 400 in tight spaces such as recessed lighting.

Figure 8A:
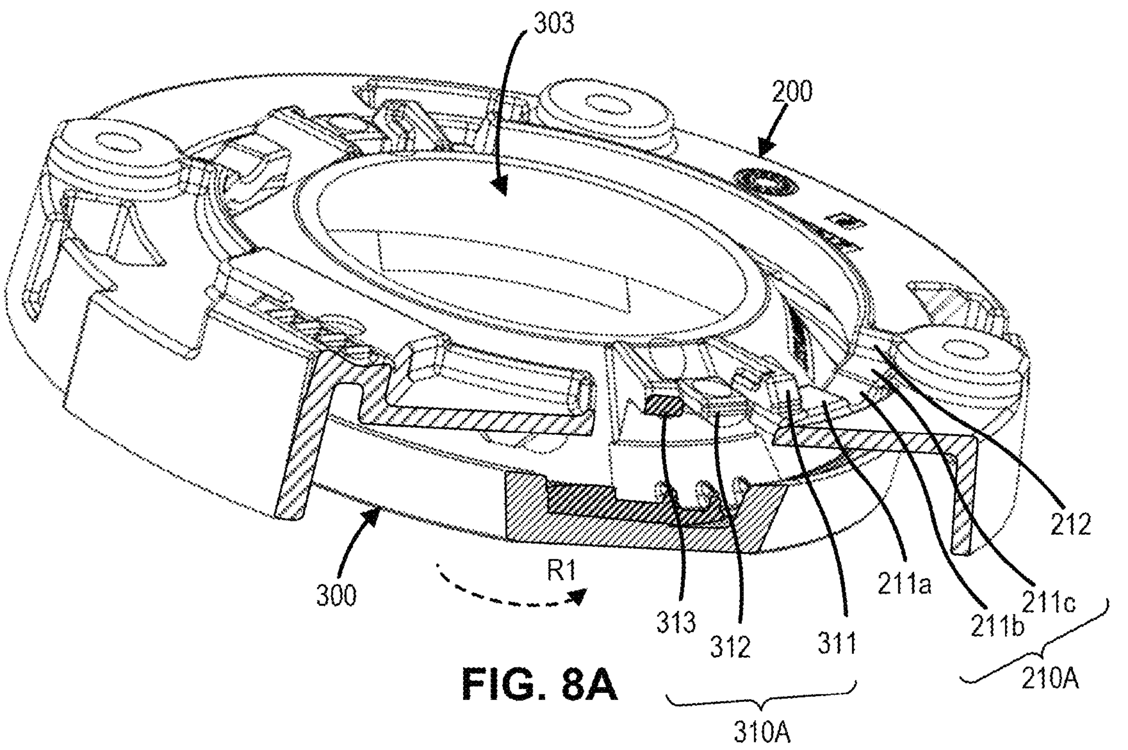
FIG. 8A illustrates a partial cross-sectional view of the optic and the retention ring in a disengaged state.
Figure 8B:
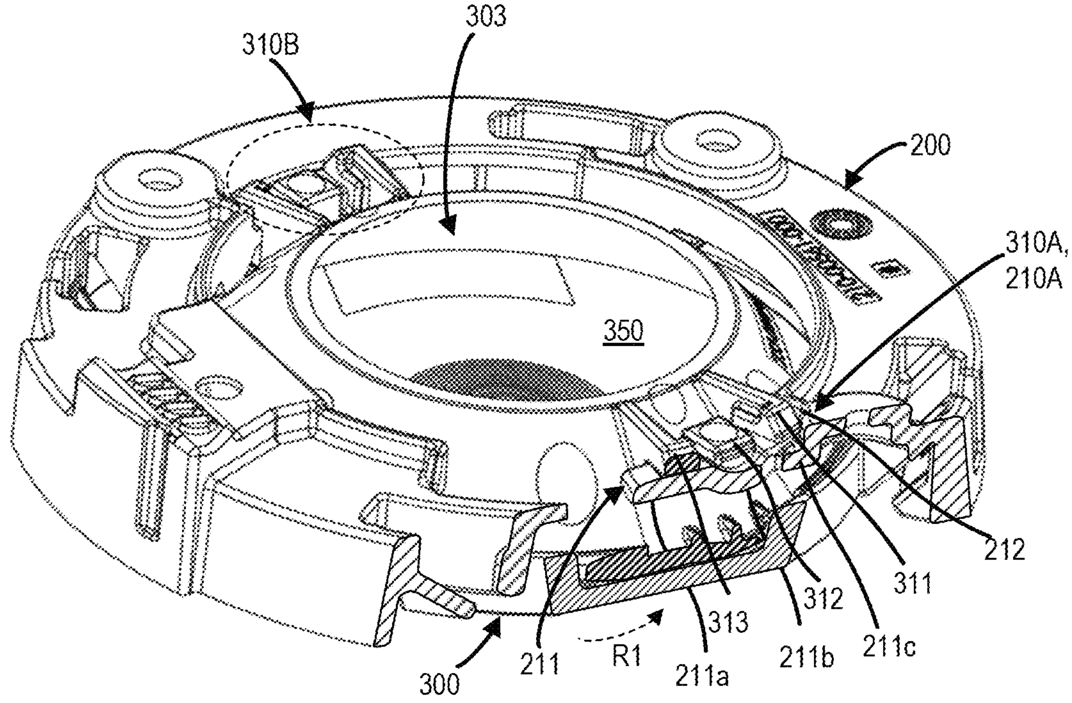
FIG. 8B illustrates a partial cross-sectional view of the optic and the retention ring in an engaged state.

FIGS. 8A and 8B illustrate an example assembly process of the optic 300 with the retention ring 200. FIG. 8A illustrates a partial cut-section view of the optic 300 and the retention ring 200 in a disengaged state. The optic 300 can be inserted through the recess of the retention ring 200 until a top portion of the optic 300 extends above the aperture (e.g., 203) of the retention ring 200. The optic coupler 310A including the projecting elements 311-313 can be positioned above the optic retention element 210A. The projecting elements 311-313 can be in a first orientation relative to the optic retention element 210A and disengaged therefrom. For example, in the first orientation, an edge of the first projecting element 311 is aligned with an edge of the first portion 211*a* of the optic retention element 210A. Once aligned, the optic 300 can be rotated in R1 direction (e.g., clockwise when viewed from a bottom side of the retention ring 200) so that the optic 300 engages with and is securely retained by the retention ring 200.

As the optic 300 is rotated in the R1 direction, the bottom surface 311*s* of the first projecting element 311 contacts the top surface of the first portion 211*a* of the optic retention element 210A. When rotated further, the bottom surface 312*s* of the second projecting element 312 starts engaging with the first portion 211*a*. The bottom surface 312*s* has a raised profiled surface extending below the bottom surfaces 311*s*, 313*s* of the projecting elements 311, 313, as discussed earlier. Hence, the bottom surface 312*s* of the second projecting element 312 pushes or deflects downwardly the first portion 211*a* of the optic retention element 210A resulting from a cantilever or spring action. Upon rotating further, the raised surface 312*s* of the second projecting element 312 reaches or matches with the recess portion 211*b* of the optic retention element 210A. The raised surface 312*s* is received within the recess portion 211*b* causing the optic retention element 210A to retract or spring back to its initial position. Also, the first projecting element 311 is stopped from advancing or rotating further by the wall 212. Thus, the optic 300 is locked in position with respect to the retention ring 200.

FIG. 8B illustrates a partial cut-section view of the optic 300 and the retention ring 200 in an engaged state. As shown, in the engaged or locked state, the first projecting element 311 can be engaged with the third portion 211*c* and blocked by the wall 212 of the optic retention element 210A. This way, the optic 300 cannot advance further when in locked state. The second projecting element 312 can be aligned with the second portion 211*b* of the optic retention element 210A and the raised surface 312*s* can be positioned within the recess 211*b* of the optic retention element 210A to lock the optic 300 in place. The third projection element 313 can be supported by the first portion 211*a* of the optic retention element 210A. This way, the optic 300 can be coupled and secured with the retention ring 200.

In order to disengage, the optic 300 can be rotated in a direction opposite to R1 (e.g., in a counterclockwise direction). The relative movement of the projecting elements 311-313 and the portions 211*a*-211*c* of the optic retention element 210A can be similar to that discussed above, except in the opposite direction. For example, the raised surface 312*s* of the second projecting element 312 gradually pushes the first portion 211*a* of the optic retention element 210A in a downward direction until it passes the first portion 211*a*. And the optic 300 is disengaged when the first projecting element 311 moves past the first portion 211*a*, as shown in FIG. 8A.

Figure 9A:
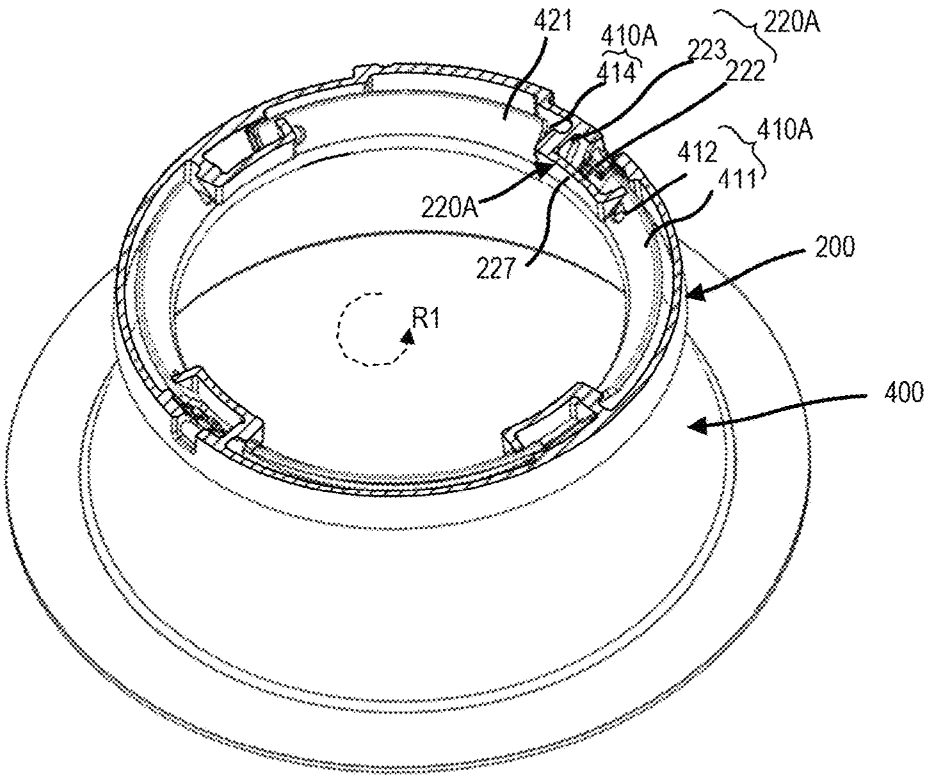
FIG. 9A illustrates a partial cross-sectional view of the trim and the retention ring in a disengaged state.
Figure 9B:
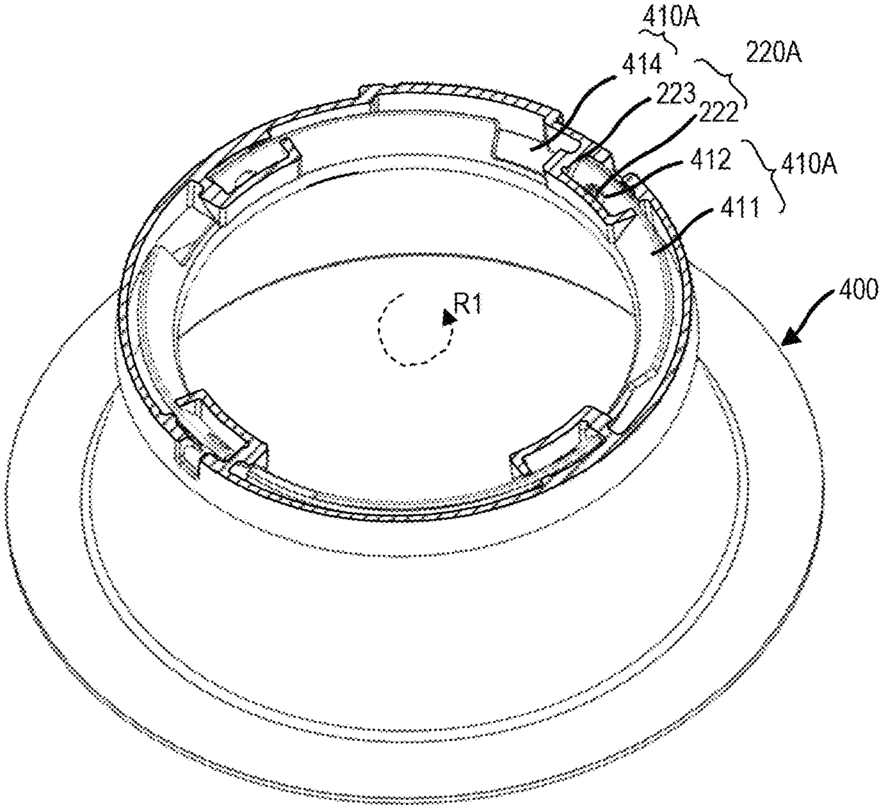
FIG. 9B illustrates a partial cross-sectional view of the trim and the retention ring in an engaged state.

FIGS. 9A and 9B illustrate an example assembly process of the trim 400 with the retention ring 200. FIG. 9A illustrates a partial cut-section view of the trim 400 and the retention ring 200 in a disengaged state. The trim 400 can be inserted through the recess 203 of the retention ring 200 until aligned with the trim retention elements (e.g., angular edges of the trim retention elements) on the bottom surface 201*b* the retention ring 200. The trim 400 does not project above the retention ring 200. For example, a top flange 405 can include windows configured to align with the trim retention elements 220A-220D on the retention ring 200 so that the trim 400 can clear those when moved upwardly. The trim 400 can be in a first orientation relative to the trim retention element 220A and disengaged therefrom. In the first orientation, the windows (e.g., 413, 414, 423, 433) of the trim couplers 410A-410D are each aligned with a trim retention element 220A-220D. Once the trim 400 is positioned and slightly rotates, the flange portion 411 can be at least partially inserted in the channel (e.g., 225 best seen in FIG. 4D). The other flange portion 421 can be beyond the trim coupler 410A so that the wall 223 of the trim retention element 220A is positioned within the window 414. Once the trim 400 is aligned with the retention ring 200 in the first orientation, the trim 400 can be rotated in R1 direction (e.g., clockwise when viewed from a bottom side of the retention ring 200) so that the trim 400 engages with and is securely retained by the retention ring 200.

As the trim 400 is rotated in the R1 direction, the flange portion 411 pushes the engagement tab 222 of the retention ring 200 until the raised surface (e.g., 222*a* best seen in FIG. 4D) of the engagement tab 222 is positioned in the hole 412 of the trim coupler 410A. Once the raised surface of the engagement tab 222 is positioned in the hole 412, the engagement tab 222 of the trim retention element 220A retracts or springs back to its initial position within the hole 412 and locks the trim 400 in position. Also, the edge of the flange portion 411 is stopped from advancing by the wall 223.

FIG. 9B illustrates a partial cut-section view of the trim 400 and the retention ring 200 in an engaged state. As shown, in the engaged or locked state, the raised surface of the engagement tab 222 is located within the hole 412 and the edge of the flange portion 411 is blocked by the wall 223. This way, the trim 400 cannot advance further when in locked state.

To disengage, the trim 400 can be rotated in a direction opposite to R1 (e.g., in a counterclockwise). The relative movement of the flange portion 411, the window 414, and the hole 412 and the trim retention element (e.g., 222) are similar to that discussed above, except in the opposite direction. For example, the raised surface allows the engagement tab 222 to be gradually pushed away from the flange portion 411 until the edge of the flange portion 411 moves past the engagement tab 222 so that the trim 400 is disengaged, as shown in FIG. 9A.

The particular features, structures or characteristics discussed herein can be combined in any suitable manner in one or more embodiments. Further, it is intended that embodiments of the disclosed subject matter cover modifications and variations thereof.

It is to be understood that terms such as "top," "bottom," "front," "side," "length," "interior," "inner," "outer," and the like that can be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Different arrangements of the components depicted in the drawings or described above, as well as components and steps not shown or described are possible. Similarly, some features and subcombinations are useful and may be employed without reference to other features and subcombinations.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An optical assembly comprising:

an optic configured to receive light from a light source, the optic comprising an optic coupler;

a trim configured to surround the optic and direct the light away from the light source, the trim comprising a trim coupler;

a retention ring configured to tool-lessly couple with the optic and the trim, the retention ring comprising:

an optic retention element configured to tool-lessly couple with the optic coupler to couple the optic to the retention ring; and a trim retention element spaced radially outwardly from the optic retention element, the trim retention element configured to tool-lessly couple with the trim coupler to couple the trim to the retention ring radially outwardly from the optic.

2. The optical assembly of claim 1, wherein the optic coupler and the optic retention element comprise complimentary features to facilitate twist and lock coupling between the optic and the retention ring.

3. The optical assembly of claim 1, wherein:

the optic coupler of the optic comprises at least one projecting element extending laterally outwardly from the optic; and the optic retention element of the retention ring has an elongated shape, the elongated shape configured to support the at least one projecting element and lock the optic with the retention ring.

4. The optical assembly of claim 3, wherein each of the optic, the trim, and the retention ring comprises a central aperture on a light receiving side, and wherein the optic retention element extends along the central aperture of the retention ring.

5. The optical assembly of claim 4, wherein the optic retention element comprises a fixed end integrally formed with the retention ring and a free end.

6. The optical assembly of claim 3, wherein:

the at least one projecting element of the optic coupler comprises a raised surface portion; and the optic retention element comprises a recess portion configured to receive the raised surface portion of the optic coupler.

7. The optical assembly of claim 6, wherein the raised surface portion of the optic coupler is configured to deflect the optic retention element of the retention ring and wherein the optic retention element is configured to retract when the raised surface portion of the optic coupler is received in the recess portion.

8. The optical assembly of claim 6, wherein the at least one projecting element comprises a first projecting element, a second projecting element, and a third projecting element spaced from each other, the second projecting element located between the first and the third projecting elements, the second projecting element comprising the raised surface portion.

9. The optical assembly of claim 8, wherein:

bottom surfaces of the first projecting element and the third projecting element lie in the same plane, and a bottom surface of the second projecting element is offset from the bottom surfaces of the first projecting element and the third projecting element.

10. The optical assembly of claim 1, wherein the trim coupler of the trim comprises a flange including at least one hole and at least one window, wherein the flange is an angular flange.

11. The optical assembly of claim 10, wherein the trim retention element comprises a channel to receive the flange of the trim and an engagement tab adapted to engage the hole to lock the trim with the retention ring.

12. The optical assembly of claim 11, wherein the at least one hole of the trim is a profiled hole, wherein the engagement tab of the trim retention element comprises a protrusion adapted to seat at least partially within the profiled hole of the trim retention element.

13. The optical assembly of claim 11, wherein the trim retention element comprises a first sidewall disposed on a first side of the engagement tab, and a second sidewall on a second side opposite to the first side, the second sidewall configured to abut an edge of the at least one window of the trim.

14. The optical assembly of claim 13, wherein:

each of the first and the second sidewalls have an angular edge configured to receive the angular flange within the channel of the retention ring; and the engagement tab is oriented at an angle corresponding to an angle of the angular flange.

15. An optic and trim retention ring comprising:

a base comprising a central aperture;

an optic retention element provided proximate the central aperture of the base and comprising an elongated curved arm configured to tool-lessly twist and lock an optic to the retention ring; and a trim retention element formed on the base and radially spaced from the optic retention element, the trim retention element configured to tool-lessly twist and lock a trim to the retention ring radially outward of the optic.

16. The retention ring of claim 15, wherein the curved arm of the optic retention element comprises a fixed end fixed to the base and a free end and wherein the curved arm is configured to deflect relative to the base, wherein the optic retention element extends along the central aperture.

17. The retention ring of claim 16, wherein the optic retention element comprises a first flat portion at the free end, a second flat portion at the fixed end, and a recess portion between the first flat portion and the second flat portion, wherein the recess portion is configured to receive a raised surface portion of the optic.

18. The retention ring of claim 15, wherein the trim retention element comprises:

a channel extending along an arcuate axis and configured to receive a flange of the trim; and an engagement tab adapted to seat within a hole in the flange to lock the trim with the retention ring.

19. The retention ring of claim 18, wherein the engagement tab of the trim retention element comprises a profiled raised surface configured to gradually move the engagement tab when engaged with the flange of the trim and configured to be received within the hole of the flange.

20. The retention ring of claim 18, wherein the trim retention element comprises a first sidewall disposed on a first side of the engagement tab, and a second sidewall on a second side opposite to the first side, the second sidewall configured to stop the trim from advancing when locked with the retention ring, and wherein each of the first and the second sidewalls comprises an angular edge and the channel extends between the first sidewall and the second sidewall.

* * * * *